May 24, 1932. W. A. BRACKEN 1,860,228
COMBINED SUPPORTING AND RATCHET BRACKET
Filed Feb. 7, 1928
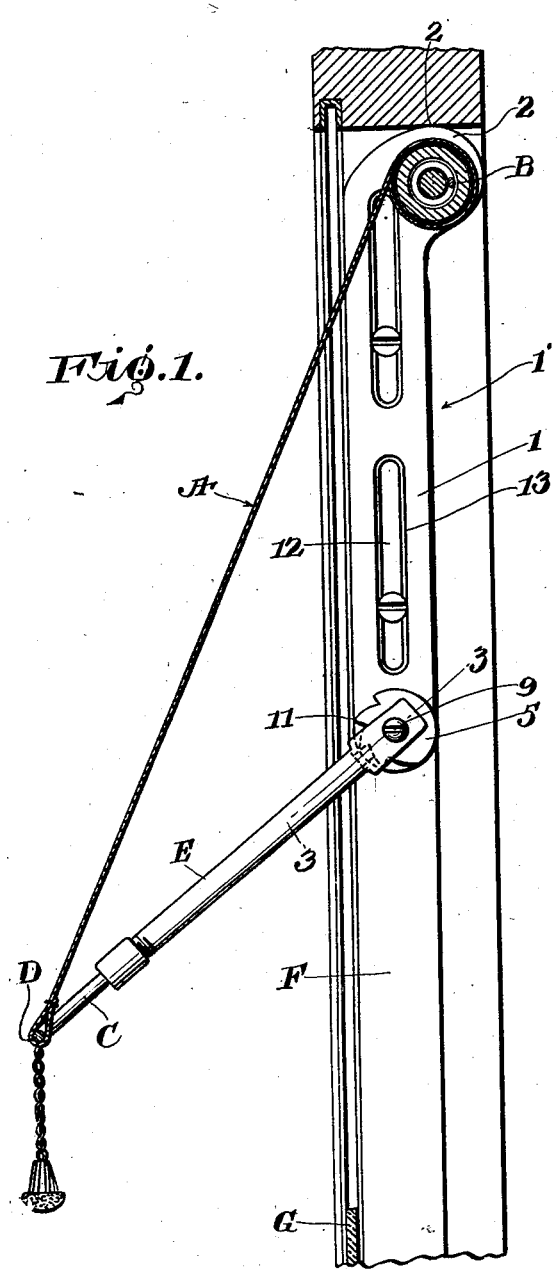
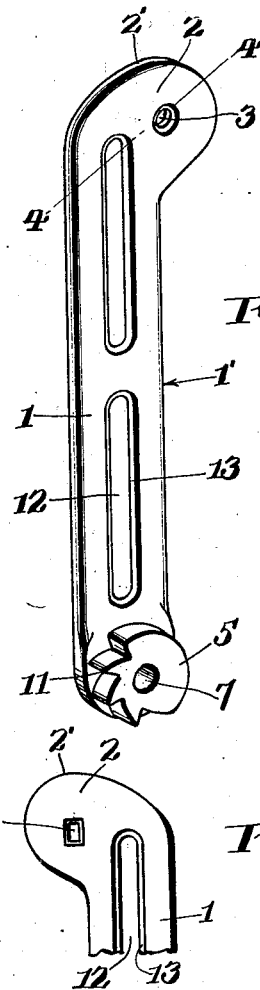
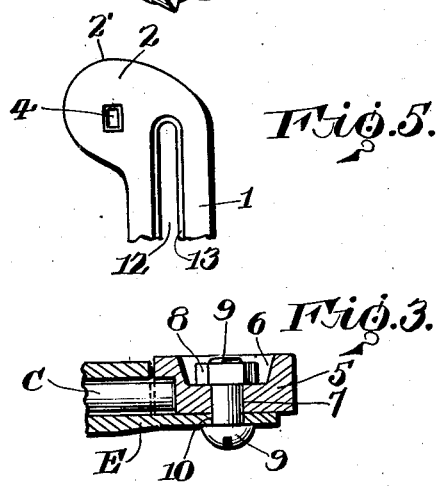
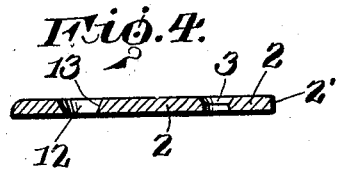
INVENTOR.
William A. Bracken,
BY Geo. P. Kimmel
ATTORNEY.

Patented May 24, 1932

1,860,228

UNITED STATES PATENT OFFICE

WILLIAM A. BRACKEN, OF ELDORADO, KANSAS, ASSIGNOR OF ONE-HALF TO WILLIAM B. JONES, OF AUGUSTA, KANSAS

COMBINED SUPPORTING AND RATCHET BRACKET

Application filed February 7, 1928. Serial No. 252,621.

This invention relates to a combined supporting and ratchet bracket, and is designed primarily for use in connection with the type of spring controlled rolling awning structure as disclosed in my application Serial No. 132,193, filed Aug. 28, 1926, but it is to be understood that a bracket in accordance with this invention may be employed in any connection for which it is found applicable.

The object of the invention is to provide, in a manner as hereinafter set forth, a bracket for supporting an awning of the spring controlled rolling type for use in connection with doors, windows and other openings, and more particularly doors, windows and other openings in automobiles.

Another object of the invention is to provide, in a manner as hereinafter set forth an integral mounting for pivotally supporting the yoke arms of the awning and also for supporting a spring controlled winding roller for the awning body or web.

A further object of the invention is to provide in a manner as hereinafter set forth, a supporting bracket for the purpose referred to which will detachably secure the awning body in projected relation at any desired angle relative to the door, window or other opening, and further provides a structure that supports the awning in a closed position without interfering with the operation of a vertically movable closure for a door or window opening.

A further object of the invention is to provide, in a manner as hereinafter set forth, a supporting bracket which is longitudinally adjustable with respect to the side frames of the door or window to which it is attached, and is so constructed that the awning web will not touch or bind against the top frame under any conditions.

Another and further object of the invention is to provide, in a manner as hereinafter set forth, and for the purposes referred to, a slot or slots in the bracket to facilitate the selection of the firmest point of attachment, and further to provide a pivot bearing member in which the operating parts are seated without interfering with the frame to which the bracket is attached.

Further objects of the invention are to provide, in a manner as hereinafter set forth a supporting bracket for the foregoing purposes, which is comparatively simple in its construction and arrangement, strong, durable, compact, thoroughly efficient in its intended use, conveniently attached and adjusted, comparatively inexpensive to manufacture, and will not be conspicious nor detract from the appearance of the door or window frame to which it is attached.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications may be resorted to which fall within the scope of the claim hereunto appended.

In the drawings wherein like reference characters denote corresponding parts throughout the several views:—

Figure 1 is a side elevation of a door or window frame illustrating an awning structure supported by a bracket in accordance with this invention.

Figure 2 is a perspective view of one of the brackets.

Figure 3 is a section taken on line 3—3 of Figure 1.

Figure 4 is a section on line 4—4 of Figure 2.

Figure 5 is a fragmentary view in perspective of the complementary bracket to Figure 2 illustrating the roller pintle support.

Referring to the drawings in detail and for the purpose of describing the bracket in accordance with this invention, it will be seen that the brackets are used in pairs, one of which is secured to the opposite side rails of the door or window frame in alignment with the other, and wherein each bracket of the pair is the complement of the other, with the exception of the shape of the openings which support the pintles of the winding awning roller.

The bracket is illustrated in the drawings, Figure 1, by way of example in connection with a spring controlled rolling awning structure referred to generally at A, and including a spring controlled winding roller B, a latching arm C, forming an element of a yoke D and slidably mounted in a pivoted tubular member E. The rolling awning structure is illustrated as set up with a door or window frame F having the glass G vertically adjustable. The brackets are to be positioned on opposed walls of the window opening rearwardly of the glass G.

The bracket designated generally as at 1 may be cast or stamped of any suitable material and the size and thickness thereof may be such as the purpose demands. The bracket body portion 1 consists of a substantially flat piece of material of considerably greater length than its width and substantially oblong in contour. The bracket terminates at one end, in an angularly disposed arm 2 projecting rearwardly from the extremity of the rear side edge of the body 1 of the bracket. The arm 2 projects rearwardly in the same. The said arm 2 has a countersunk circular opening 3 extending therethrough and adapted to receive the rotatable pintle of the winding roller B. In the arm 2 of the complementary bracket (Figure 5) a substantially rectangular countersunk opening 4 receives the other pintle of the winding roller B. The openings 3 and 4 are so spaced with respect to the upper edge 2' of the arm 2, that the web of the awning will not bind against the top rail of the door or window frame when the edge 2' abuts against the said rail, as will be understood by reference to Figure 1 of the drawings.

The lower end of the body 1 of the bracket has formed integral therewith a laterally extending circular enlargement or portion 5, preferably of a thickness greater than that of the body of the bracket, but of such thickness as is necessary to make a strong and durable support for the pivot for the awning, and in addition, form a cavity or pocket for the fastening device to be hereinafter described. The lower end of the body 1 of the bracket is formed with a cavity or pocket 6 opening on the inner face thereof, and the lower end of the bracket is furthermore provided with an opening 7 concentric with respect to the circular enlargement 5 and which extends axially from the outer face of the said enlargement into the cavity 6. The opening 7 is concentric with respect to the cavity 6, and therefore the cavity 6 and circular enlargement are concentric relative to each other. Moreover, the opening 7 is located on the longitudinal median of the body portion and extends in a plane perpendicular to said median. A fastening means 8 for engaging a pivot 9 is seated within the cavity 6 in such manner that it will not touch the frame of the opening or interfere with the attachment of the bracket thereto. The pivot 9 extends through the opening 10 in the tubular yoke support E, continues through the opening 7 of the enlarged portion 5, is fastened in the cavity 6 by means of the holdfast device 8 and rotatably secures the said support in position. A part of the peripheral face of the enlarged portion 5 is formed with a set of ratchet teeth 11 into which the end of the arm C is latched in selective positions, whereby the yoke D is disposed at variant angular positions with respect to the frame of the opening. The opening 7 is concentric with respect to the ratchet teeth 11.

Extending longitudinally and located substantially in the median line of the width of the body 1, are two spaced slots 12 running substantially the whole length of the bracket between the enlarged portion 5 and the rearwardly extending arm 2. The edges of the slots are beveled as at 13 (Figure 4) so as the tapered shoulder of the attaching screw head 14 will be countersunk, thereby seating the screw flush with the flat contour of the body of the bracket. The length of said slots 12 will not only allow longitudinal adjustment of the bracket with respect to the rail to which it is attached, but they will allow the mechanic a greater latitude in selecting the point of attachment so as to insure a firm and durable installation.

It is believed that the many advantages of the combined support and ratchet bracket in accordance with this invention, and for the purposes set forth, can be readily understood, and although the preferred embodiment of the invention is as illustrated and described, yet it is to be understood that changes in the details of construction can be had which fall within the scope of the invention claimed.

What I claim is:—

A combined supporting and ratchet bracket for spring controlled rolling awning structures comprising an elongated, flat, narrow, slotted body for connection vertically to the side wall of a window opening and of a length and width less than that of said wall; said body having a rearwardly directed, upwardly inclined apertured extension at one end for suspendingly supporting a pintle of the spring controlled winding element of the awning structure, a circular enlargement projecting from the outer face of said body at the other end of the latter, said enlargement having the forward portion of its edge provided with a set of ratchet teeth disposed upon an arc, said body having at said other end a cavity opening at the inner face thereof, and said enlargement having an axial opening communicating with said cavity, said opening and cavity providing respectively for the reception of a pivot for the awning structure and a holdfast means for the pivot.

In testimony whereof I affix my signature hereto.

WILLIAM A. BRACKEN.